(12) United States Patent
David et al.

(10) Patent No.: US 10,113,464 B2
(45) Date of Patent: Oct. 30, 2018

(54) METHOD AND APPARATUS FOR CONTROLLING REDUCTANT INJECTION INTO AN EXHAUST GAS FEEDSTREAM FROM AN INTERNAL COMBUSTION ENGINE

(71) Applicant: GM GLOBAL TECHNOLOGY OPERATIONS LLC, Detroit, MI (US)

(72) Inventors: Giovanni David, Turin (IT); Luca Lauritano, Piemonte (IT); Giuseppe Antonio Spina, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 15/373,031

(22) Filed: Dec. 8, 2016

(65) Prior Publication Data
US 2018/0163589 A1 Jun. 14, 2018

(51) Int. Cl.
*F01N 3/00* (2006.01)
*F01N 3/20* (2006.01)
(Continued)

(52) U.S. Cl.
CPC ............ *F01N 3/208* (2013.01); *F01N 11/002* (2013.01); *F01N 13/0093* (2014.06); *F01N 2560/06* (2013.01); *F01N 2610/02* (2013.01); *F01N 2900/1616* (2013.01); *F01N 2900/1814* (2013.01)

(58) Field of Classification Search
CPC .. F01N 3/208; F01N 13/0093; F01N 2610/02; F01N 2560/021; F01N 13/009; F01N 2560/026; F01N 3/2066; F01N 2570/18; F01N 2900/1812; F01N 11/00; F01N 13/008; F01N 2610/14; B01D 2251/2062; B01D 2255/9032; B01D 53/9409; B01D 53/9422; B01D 53/9436; Y02A 50/2325
See application file for complete search history.

(56) References Cited

U.S. PATENT DOCUMENTS 8,516,798 B2 * 8/2013 Dobson ................... F01N 3/035
60/286
8,555,623 B2 * 10/2013 Yasui ...................... F01N 3/208
60/286

(Continued)

*Primary Examiner* — Mark Laurenzi
*Assistant Examiner* — Anthony Ayala Delgado
(74) *Attorney, Agent, or Firm* — Quinn IP Law (57) ABSTRACT

An exhaust aftertreatment system includes first and second selective catalytic reduction devices (SCRs) and a single reductant injection system. A total ammonia storage capacity and an ammonia storage level are determined for the first and second SCRs, and determine a total SCR ammonia storage level for the first and second SCRs based upon the ammonia storage level on the first and second SCRs. A first storage error is determined, and a second storage error is determined based upon an ammonia storage level and an ammonia storage capacity for the second SCR. A second reductant dosing rate is determined based upon the second storage error. The reductant injection system injects reductant into the exhaust gas feedstream based upon the second reductant dosing rate when the second storage error indicates an imbalance between the ammonia storage on the first SCR and the ammonia storage on the second SCR.

20 Claims, 3 Drawing Sheets

(51) Int. Cl.
*F01N 13/00* (2010.01)
*F01N 11/00* (2006.01)

(56) References Cited

U.S. PATENT DOCUMENTS

| | | | |
|---|---|---|---|
| 8,671,665 B2* | 3/2014 | Yasui | F01N 3/208 |
| | | | 60/286 |
| 9,546,584 B2* | 1/2017 | Qi | F01N 3/2066 |
| 2017/0037758 A1* | 2/2017 | Geveci | F01N 3/208 |
| 2017/0114690 A1* | 4/2017 | Gupta | F01N 3/208 |
| 2017/0130629 A1* | 5/2017 | Nagel | F01N 3/208 |
| 2017/0175607 A1* | 6/2017 | De Smet | F01N 13/0093 |
| 2017/0306819 A1* | 10/2017 | Alfieri | F01N 3/208 |

* cited by examiner

METHOD AND APPARATUS FOR CONTROLLING REDUCTANT INJECTION INTO AN EXHAUST GAS FEEDSTREAM FROM AN INTERNAL COMBUSTION ENGINE

INTRODUCTION

Exhaust aftertreatment systems fluidly couple to internal combustion engines to purify exhaust gases generated as byproducts of combustion. Exhaust aftertreatment systems may include oxidation catalysts, reduction catalysts, selective catalytic reduction catalysts and particulate filters. Byproducts of combustion may include unburned hydrocarbons, carbon monoxide, nitrides of oxide, which may be referred to as NOx molecules, and particulate matter. Operation may be monitored by one or more sensing devices that are disposed in the exhaust gas feedstream. Operation may also be determined employing simulation models that dynamically execute during operation.

Selective catalytic reduction catalysts (SCRs) may employ reductants for reducing NOx molecules to elemental nitrogen. One reductant is urea, which may be transformed into ammonia (NH3) in an exhaust system. The reductant may be injected into the exhaust gas feedstream upstream of one or multiple selective catalytic reduction catalysts, and may be stored on a surface or otherwise captured for use in reducing NOx molecules to elemental nitrogen and water.

SUMMARY

An exhaust aftertreatment system disposed to purify an exhaust gas feedstream for an internal combustion engine is described. The exhaust aftertreatment system includes first and second selective catalytic reduction devices (SCRs), wherein the first SCR is disposed upstream relative to the second SCR and a reductant injection system is disposed to inject reductant into the exhaust gas feedstream upstream relative to the first SCR. A first temperature sensor is disposed to monitor a temperature of the exhaust gas feedstream upstream relative to the first SCR, and a second temperature sensor is disposed to monitor the exhaust gas feedstream upstream relative to the second SCR. A controller is operatively connected to the reductant injection system and in communication with the first and second temperature sensors and the internal combustion engine. The controller includes an instruction set that is executable to determine a total ammonia storage capacity and an ammonia storage level for the first and second SCRs, and determine a total SCR ammonia storage level for the first and second SCRs based upon the ammonia storage level on the first SCR and the ammonia storage level on the second SCR. A first storage error is determined based upon total ammonia storage capacity for the first and second SCRs and the total SCR ammonia storage level for the first and second SCRs, and a second storage error is determined based upon an ammonia storage level for the second SCR and an ammonia storage capacity for the second SCR. A first reductant dosing rate is determined based upon the first storage error, and a second reductant dosing rate is determined based upon the second storage error. The reductant injection system is controlled to inject reductant into the exhaust gas feedstream based upon the second reductant dosing rate when the second storage error indicates an imbalance between the ammonia storage on the first SCR and the ammonia storage on the second SCR.

An aspect of the disclosure includes controlling the reductant injection system to inject reductant into the exhaust gas feedstream based upon the second reductant dosing rate when the second storage error indicates an imbalance between the ammonia storage level on the first SCR and the ammonia storage level on the second SCR that is associated with ammonia slip.

Another aspect of the disclosure includes monitoring first and second temperatures of the exhaust gas feedstream and an exhaust gas flowrate, and determining the ammonia storage level associated with the first SCR based upon the first and second temperatures of the exhaust gas feedstream and the exhaust gas flowrate.

Another aspect of the disclosure includes determining the ammonia storage level associated with the second SCR based upon the first and second temperatures of the exhaust gas feedstream and the exhaust gas flowrate.

Another aspect of the disclosure includes determining an ammonia storage capacity associated with the second SCR based upon the first and second temperatures of the exhaust gas feedstream and the exhaust gas flowrate, and determining the total SCR ammonia storage capacity for the first and second SCRs based thereon.

Another aspect of the disclosure includes the reductant being urea.

Another aspect of the disclosure includes injecting reductant into the exhaust gas feedstream based upon the first reductant dosing rate when the second storage error fails to indicate the imbalance between the storage on the first device and the storage on the second device.

Another aspect of the disclosure includes the single reductant injection system being disposed to supply reductant to both the first SCR and to the second SCR.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms may be used with reference to the drawings. Directional terms are not to be construed to limit the scope of the disclosure. As employed herein, the term "upstream" and related terms refer to elements that are towards an origination of a flow stream relative to an indicated location, and the term "downstream" and related terms refer to elements that are away from an origination of a flow stream relative to an indicated location. Furthermore, the disclosure, as illustrated and described herein, may be practiced in the absence of an element that is not specifically disclosed herein.

Figure 1:
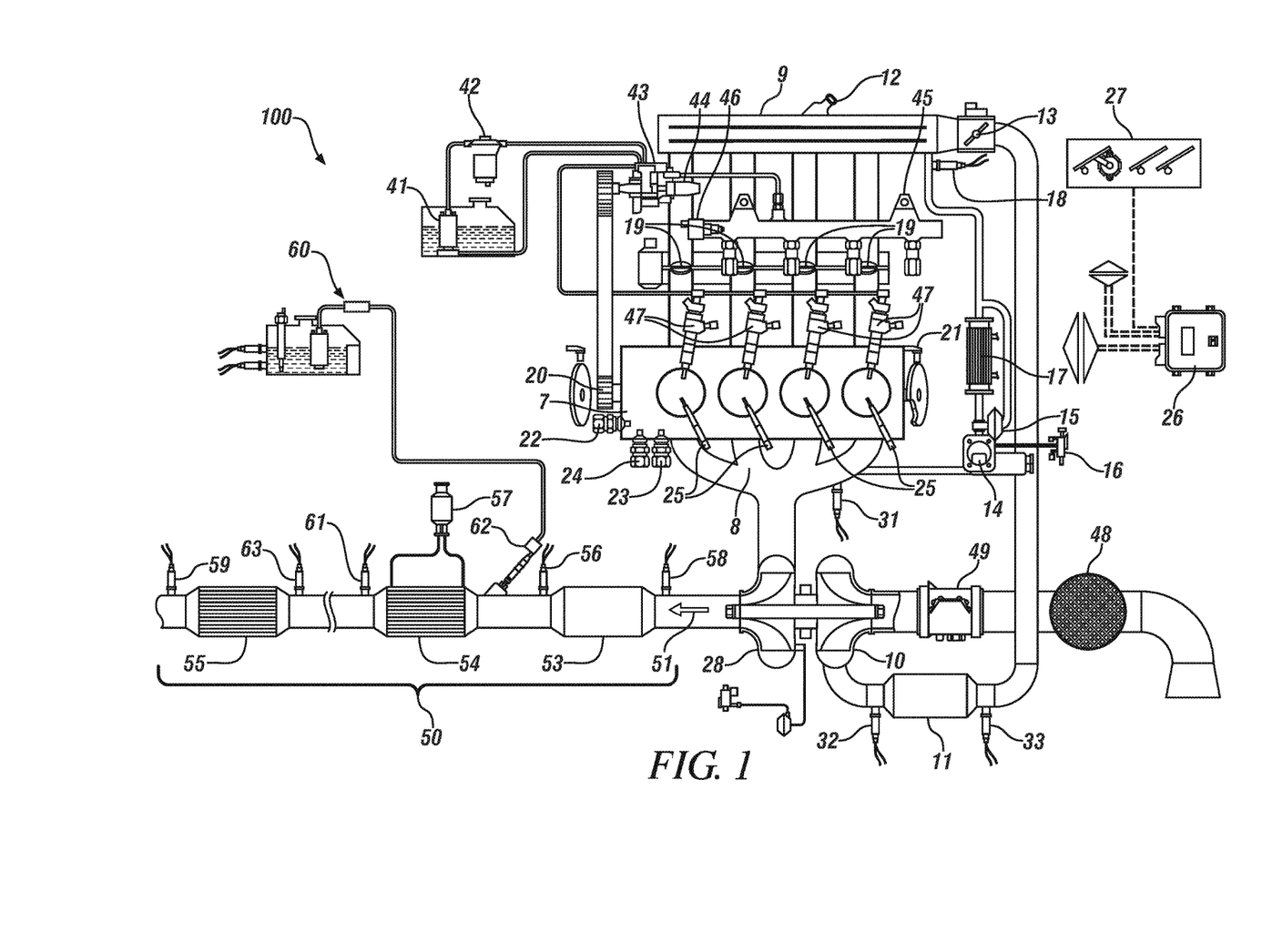
FIG. 1 schematically illustrates an internal combustion engine fluidly coupled to an exhaust gas aftertreatment system that includes first and second selective catalytic reduction devices (SCRs) and a reductant delivery system, in accordance with the disclosure.

Referring now to the drawings, wherein the depictions are for the purpose of illustrating certain exemplary embodiments only and not for the purpose of limiting the same, FIG. 1 schematically illustrates an internal combustion engine (engine) 100 that is fluidly coupled to an exhaust aftertreatment system 50 that is arranged in accordance with an embodiment of this disclosure. The engine 100 is a multi-cylinder internal combustion engine that combusts a mixture of directly-injected fuel, intake air and recirculated exhaust gas to generate mechanical power. The engine 100 is configured as a compression-ignition engine as shown, although the concepts described herein may be employed on other engine configurations that employ embodiments of the exhaust aftertreatment system 50 described herein. The engine 100 may be employed on a ground vehicle, e.g., a passenger car, truck, agricultural vehicle or a construction vehicle, on a marine vehicle, or in a stationary setting, e.g., coupled to an electric power generator.

The engine 100 preferably includes a multi-cylinder engine block 7, an intake manifold 8 for channeling intake air to the cylinders of the engine 100, and an exhaust manifold 9 for entraining exhaust gas for channeling through the exhaust aftertreatment system 50. Other unillustrated engine components and systems include pistons, crankshaft, engine head(s), intake valves, exhaust valves, camshaft(s), and variable cam phasers when employed. The engine 100 preferably operates in a four-stroke combustion cycle of repetitively-executed strokes of intake-compression-combustion-exhaust. A variable geometry turbocharger (VGT) includes a turbine 28 that fluidly couples to the exhaust manifold 9 upstream relative to the exhaust aftertreatment system 50 in one embodiment. The engine 100 includes a plurality of direct-injection fuel injectors 47 that are arranged to directly inject fuel into individual combustion chambers. The injectors 47 may be suitable direct-injection devices, such as solenoid-activated devices in one embodiment. Fuel is supplied to the injectors 47 from a fuel storage tank via a low-pressure fuel pump 41, a fuel filter assembly 42, a high-pressure fuel pump 43, a fuel metering valve 44, a fuel rail 45 and a pressure regulating valve 46. Each of the engine cylinders preferably includes a glow plug 25. The engine 100 also includes an intake air system, which may include an intake air filter 48, a mass air flow sensor 49, a compressor 10 of the VGT, a charge air cooler 11, a throttle valve 13, a sensor 12 for monitoring boost pressure and intake air temperature, and other sensing devices as may be useful. The engine 100 may include an exhaust gas recirculation (EGR) system that fluidly channels exhaust gas from the exhaust manifold 9 to the intake manifold 8. In one embodiment, the EGR system may include an EGR valve 14, an EGR cooler 17 including a bypass valve 15, an EGR outlet temperature sensor 18, an EGR cooler inlet temperature sensor 31 and a vacuum switch 16. The intake manifold 8 may also include a plurality of swirl valves 19 for mixing intake air and the recirculated exhaust gas. Other engine monitoring sensors may include a crankshaft position sensor 20, a camshaft position sensor 21, a coolant temperature sensor 22, an oil level switch 23 and an oil pressure switch 24, among others. One or more engine monitoring sensors may be replaced with a suitable executable model.

An engine controller 26 monitors various sensing devices and executes control routines to command various actuators to control operation of the engine 100 in response to operator commands. Operator commands may be determined from various operator input devices, including, e.g., a pedal assembly 27 that includes, by way of example, an accelerator pedal and a brake pedal. Other sensing devices associated with engine operation may include, by way of non-limiting example only, a barometric pressure sensor (not shown), an ambient air temperature sensor (not shown), a VGT position sensor (not shown), the exhaust gas temperature sensor 31, an air charge inlet temperature sensor 32 and an air charge outlet temperature sensor 33, among others.

The exhaust aftertreatment system 50 includes a plurality of fluidly connected exhaust purifying devices for purifying engine exhaust gas prior to expulsion to ambient air. An exhaust purifying device may be a device that is configured to oxidize, reduce, filter and/or otherwise treat constituents of the exhaust gas feedstream 51, including but not limited to hydrocarbons, carbon monoxide, nitrides of oxygen (NOx), and particulate matter. In the embodiment shown, first, second and third exhaust purifying devices 53, 54 and 55, respectively, are deployed. The first and second exhaust purifying devices 53, 54 may be closely coupled to the exhaust manifold 9, e.g., located within an engine compartment. The third exhaust purifying device (catalyst) 55 may be distally located, such as in an underfloor location when employed on a ground vehicle. The first exhaust purifying device 53 may be an oxidation catalyst for oxidizing hydrocarbons and other constituents in the exhaust gas feedstream in certain embodiments, and is referred to hereafter as an oxidation catalyst 53. The second exhaust purifying device 54 is preferably configured as a first selective catalyst reduction catalyst, and is referred to hereafter as the first SCR 54. In one embodiment, the first SCR 54 may also include a particulate filter for filtering particulate matter from the exhaust gas feedstream. The third catalyst 55 is preferably configured as a second SCR 55. Some embodiments may employ an oxidation catalyst downstream of the second SCR 55. A reductant delivery system 60 preferably includes a single reductant injector 62 having an injection nozzle that is positioned upstream relative to the first SCR 54. The reductant delivery system 60 is configured to controllably supply a metered flow of reductant into the exhaust gas feedstream upstream of the first SCR 54 to facilitate NOx reduction through the first and second SCRs 54, 55. In one embodiment, the first and second SCRs 54, 55 are urea-based devices, and the injected reductant is urea. As appreciated by those skilled in the art, urea may convert to ammonia (NH3), which may be stored on the substrates of the first and second SCRs 54, 55 and may react with and reduce NOx molecules to form elemental nitrogen (N2) and other inert gases.

Each of the oxidation catalyst 53, the first SCR 54 and the second SCR 55 includes a ceramic or metallic substrate having flow channels that have been coated with suitable materials that include by way of non-limiting examples: platinum-group metals such as platinum, palladium and/or rhodium; other metals, such as copper; cerium; and other materials. The coated materials effect chemical reactions to oxidize, reduce, filter or otherwise treat constituents of the exhaust gas feedstream under certain conditions related to temperature, flowrate, air/fuel ratio and others. The embodiment shown includes the elements of the exhaust aftertreatment system 50 in one arrangement, which is illustrative. In an alternative embodiment, the oxidation catalyst 53 and the first SCR 54 may be collocated on a single substrate and/or collocated within a single mechanical assembly. Other arrangements of the elements of the exhaust aftertreatment system 50 may be employed within the scope of this disclosure, with such arrangements including the addition of other exhaust purifying devices and/or omission of one or more of the exhaust purifying devices, depending upon requirements of the specific application.

Sensors for monitoring the exhaust purifying devices of the exhaust aftertreatment system 50 may include first and second exhaust gas sensors 58, 61, respectively, one or multiple particulate matter sensors 59, and a delta pressure sensor 57 for monitoring pressure drop across the first SCR 54, first and second temperature sensors 56, 63, and/or other suitable sensing devices and models for monitoring the exhaust gas feedstream. The first and second exhaust gas sensors 58, 61 are preferably configured as NOx sensors, and in one embodiment may include wide-range lambda sensing capability. Such sensors and models may be arranged to monitor or otherwise determine parameters related to the exhaust gas feedstream at specific locations. As such, the aforementioned sensors and/or models may be advantageously employed to monitor performance of individual ones of the exhaust purifying devices, monitor parameters associated with performance of a subset of the exhaust purifying devices, or monitor parameters associated with performance of the overall exhaust aftertreatment system 50. The first exhaust gas sensor 58 is preferably arranged to monitor the exhaust gas feedstream upstream relative to the oxidation catalyst 53, as shown. The second exhaust gas sensor 61 is preferably arranged to monitor the exhaust gas feedstream upstream relative to the second SCR 55 and downstream relative to first SCR 54. The first and second exhaust gas sensors 58, 61 may each be fabricated as a planar-type zirconium oxide dual cell device having a sensing element and an integrated electrically-powered heating element, in one embodiment.

Engine control includes controlling various engine operating parameters, including controlling preferred engine control states to minimize various exhaust gas constituents through chemical reaction processes that include, by way of non-limiting examples, oxidation, reduction, filtering, and selective reduction. Other engine control states include controlling operating parameters to warm-up the engine 100 and transfer heat or otherwise warm up various ones of the oxidation catalyst 53, the first SCR 54 and the second SCR 55 so as to effect efficacious operation thereof.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in a suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and that may include monitoring or otherwise determining states of parameters and updating the states of the parameters during execution of a routine or between iterations of execution of the routine.

Figure 2:
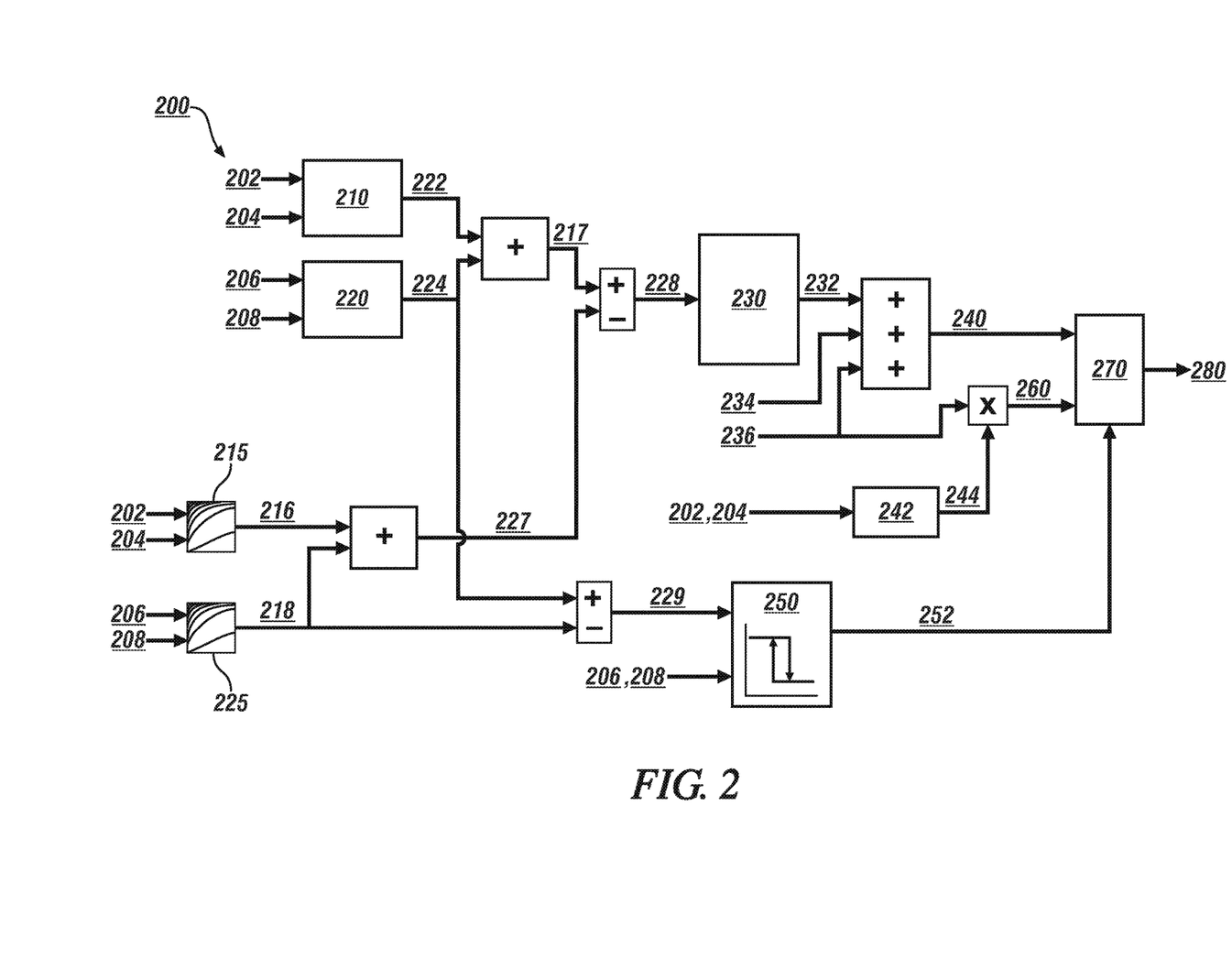
FIG. 2 schematically shows a closed-loop reductant injection control routine that may be employed to control reductant delivery in an embodiment of the exhaust aftertreatment system described with reference to FIG. 1, in accordance with the disclosure.

Referring now to FIG. 2, with continued reference to FIG. 1, a reductant injection control routine 200 is schematically shown that may be employed to control reductant injection employing an embodiment of the exhaust aftertreatment system 50 that is fluidly coupled to the internal combustion engine 100. The reductant injection control routine 200 executes to control the single reductant delivery system 60, which is disposed to inject reductant into the exhaust gas feedstream 51 at a single location that is upstream relative to the first SCR 54. As described herein, the reductant injection control routine 200 advantageously controls operation of the single reductant injection system 60 to supply reductant to both the first SCR 54 and the second SCR 55.

Overall, the reductant injection control routine 200 includes monitoring engine operation and other factors to determine a first reductant dosing rate 240 that is responsive to the engine operation. A second reductant dosing rate 260 is determined based upon an estimate or determination of an amount of ammonia that has been consumed by the first SCR 54 (236) and other factors. Either the first reductant dosing rate 240 or the second reductant dosing rate 260 is selected and implemented as a final dosing rate 280, with the selection being based upon a second storage error 229 that is associated with a second SCR ammonia storage level 218 and a second ammonia storage capacity 224 for the second SCR 55. The second reductant dosing rate 260 is selected to balance the reductant dosing rate to account for ammonia breakthrough through the first SCR 54 to achieve balanced ammonia storage levels on the first and second SCRs 54, 55. The selected one of the first and second reductant dosing rates 240, 260 is output from the reductant injection control routine 200 and communicated to the controller 26 to control operation of the single reductant delivery system 60 to deliver reductant into the exhaust gas feedstream 51 upstream of the first SCR 54.

The reductant injection control routine 200 is configured to define separate ammonia storage setpoints for each of the first and second SCRs 54, 55, wherein both are actively controlled in ammonia storage, with the injection mass flow to the second SCR 54 being represented by the ammonia slip mass flow from the first SCR 54. The reductant injection control routine 200 is always able to reach the overall target setpoint, i.e., the sum of the storage set-points calibrated for the first and second SCRs 54, 55.

The first reductant dosing rate 240 is determined as follows. Engine operation and the engine and exhaust sensors are monitored upstream of the first SCR 54 to determine a first temperature 202 and a first exhaust flowrate 204, which are input to a first SCR setpoint calibration 210 to determine a first SCR ammonia storage capacity 222 that is associated with an amount of reductant that can be stored on the first SCR 54. Engine operation and the engine and exhaust sensors are monitored downstream of the first SCR 54 and upstream of the second SCR 55 to determine a second temperature 206 and a second exhaust flowrate 208, which are input to a second SCR setpoint calibration 220 to determine a second ammonia storage capacity 224 that is associated with an amount of reductant that can be stored on the second SCR 55.

The first and second ammonia storage capacities 222, 224 are determined based upon the aforementioned temperatures, exhaust gas flowrates, space velocities and aging factors that are associated with the first and second SCRs 54, 55. A total ammonia storage capacity 217 is determined by arithmetically combining the first SCR ammonia storage capacity 222 and the second ammonia storage capacity 224.

The first temperature 202 and the first exhaust flowrate 204 are also input to a first one-dimensional kinetic model 215 that is associated with the first SCR 54 to estimate a first SCR ammonia storage level 216, which indicates a magnitude of ammonia that is stored on the first SCR 54 based upon the sensed or estimated engine and exhaust system operating parameters. In similar manner, the second temperature 206 and the second exhaust flowrate 208 are input to a second one-dimensional kinetic model 225 of the second SCR 55 to estimate a second SCR ammonia storage level 218, which indicates a magnitude of ammonia that is stored on the second SCR 55 based upon the sensed or estimated engine and exhaust system operating parameters. One-dimensional kinetic models of SCRs to generate outputs that include an estimated amount of stored ammonia on the SCR may be executed, and are based upon temperature, space velocity of the SCR, and other operating parameters. States of temperatures, space velocities, and other operating parameters are application-specific and may be determined employing engineering practices during product development, or may otherwise be determined. The first SCR ammonia storage level 216 and the second SCR ammonia storage level 218 are arithmetically combined to determine a total SCR ammonia storage level 227 on the first and second SCRs 54, 55.

A total stored ammonia error 228 is determined based upon an arithmetic difference between the total ammonia storage capacity 217 and the total SCR ammonia storage level 227. The total stored ammonia error 228, also referred to herein as a "first storage error" is input to an ammonia storage governor control routine 230, which determines an initial reductant dosing rate 232 based thereon. A first estimate of consumed ammonia 234 associated with operation of the first SCR 54 is determined, e.g., by the operation of the first one-dimensional kinetic model 215 of the first SCR 54. Likewise, a second estimate of consumed ammonia 236 associated with operation of the second SCR 55 is determined, e.g., by the operation of the second one-dimensional kinetic model 225 of the second SCR 55. The initial reductant dosing rate 232, the first estimate of consumed ammonia 234 and the second estimate of consumed ammonia 236 are arithmetically combined to determine the first reductant dosing rate 240, which may be used to control the single reductant delivery system 60 under certain circumstances.

The first temperature 202 and the first exhaust flowrate 204 are input to an aging calibration 242, which determines an aging factor 244 that is associated with the first SCR 54. The aging factor 244 takes into account time-based and temperature-based exposures originating from the exhaust gas feedstream that may affect capacity of the first SCR 54 to store ammonia. The second estimate of consumed ammonia 236 that is associated with the first SCR 54 is adjusted based upon the aging factor 244 to determine the second reductant dosing rate 260. The second reductant dosing rate 260 is a balance control reductant dosing rate that is selected to account for ammonia breakthrough through the first SCR 54 to achieve balanced ammonia storage levels on the first and second SCRs 54, 55.

A second storage error 229 associated with the second SCR 55 is determined based upon a difference between the second SCR ammonia storage level 218 and the second SCR ammonia storage capacity 224. The second storage error 229 associated with the second SCR 55 is subjected to catalyst aging-based hysteresis control (HCA) 250, which evaluates a balance between the ammonia storage levels on the first and second SCRs 54, 55, taking into account the second temperature 206 and the second exhaust flowrate 208 associated with the second SCR 55.

The second storage error 229 takes into account the first SCR ammonia storage level 216 in relation to the first SCR ammonia storage capacity 222, and the second SCR ammonia storage level 218 in relation to the second SCR ammonia storage capacity 224. The second storage error 229 indicates presence or absence of an imbalance between the ammonia storage on the first SCR in relation to the ammonia storage capacity for the first SCR, and the ammonia storage on the second SCR in relation to the ammonia storage capacity for the second SCR. The HCA 250 generates a discrete output signal 252 that is either "1" or "0", which is employed to select either the first reductant dosing rate 240 or the second reductant dosing rate 260.

The discrete output signal 252 is determined based upon the second storage error 229, taking into account the second temperature 206 and the second exhaust flowrate 208 associated with the second SCR 55. The second temperature 206 and the second exhaust flowrate 208 associated with the second SCR 55 are employed to dynamically determine an ammonia storage capacity 224 for the second SCR 55 and accounting for hysteresis and aging factors. The discrete output signal 252 from the HCA 250 indicates either a presence or an absence of an imbalance between the amount of ammonia stored on the second SCR 55 and the amount of ammonia stored on the first SCR 54, wherein the imbalance between the amount of ammonia stored on the second SCR 55 and the amount of ammonia stored on the first SCR 54 indicates that there is excess amount of ammonia stored on the second SCR 55 and reduced amount of ammonia stored on the first SCR 54. The presence of an imbalance between the amount of ammonia stored on the second SCR 55 and the amount of ammonia stored on the first SCR 54 may lead to ammonia slip out of the second SCR 55. As such, when there is an imbalance between the amount of ammonia stored on the second SCR 55 and the amount of ammonia stored on the first SCR 54 such that there is excess amount of ammonia stored on the second SCR 55 and reduced amount of ammonia stored on the first SCR 54, the HCA 250 commands the second reductant dosing rate 260, which is less than the first reductant dosing rate 240, to rebalance the reductant storage between the first and second SCRs 54, 55.

The discrete output signal 252 is input to control operation of an IF/THEN/ELSE logic device 270, or its functional equivalent. Inputs to the IF/THEN/ELSE logic device 270 include the first reductant dosing rate 240 and the second reductant dosing rate 260, with operation controlled by the discrete output signal 252. When the discrete output signal 252 is "0", the first reductant dosing rate 240 is selected and implemented as a final dosing rate 280 that is output from the reductant injection control routine 200 and communicated to the controller 26 to control operation of the single reductant delivery system 60 to deliver reductant into the exhaust gas feedstream 51. When the discrete output signal 252 is "1", the second reductant dosing rate 260 is selected and implemented as a final dosing rate 280 that is output from the reductant injection control routine 200 and communicated to the controller 26 to control operation of the single reductant delivery system 60 to deliver reductant into the exhaust gas feedstream 51.

Figure 3:
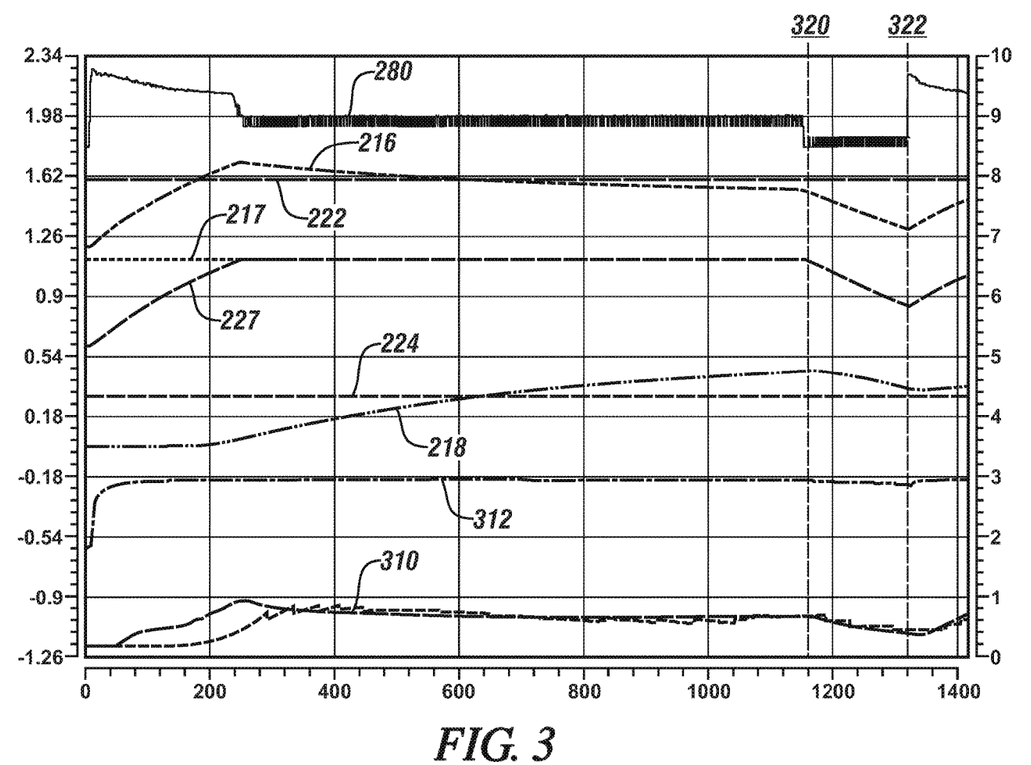
FIG. 3 graphically shows data associated with operating an embodiment of the reductant injection control routine described with reference to FIG. 2 to control reductant injection employing an embodiment of the internal combustion engine and exhaust aftertreatment system described with reference to FIG. 1, in accordance with the disclosure.

FIG. 3 graphically shows data associated with operating an embodiment of the reductant injection control routine 200 described with reference to FIG. 2 to control reductant injection employing an embodiment of the internal combustion engine 100 and exhaust aftertreatment system 50 described with reference to FIG. 1. Various parameters are shown coincidently on the vertical axis in relation to time, which is shown on the horizontal axis. The monitored parameters include the first SCR ammonia storage level 216 and the first SCR ammonia storage capacity 222, the second SCR ammonia storage level 218 and the second SCR ammonia storage capacity 224, the total ammonia storage capacity 217, the total SCR ammonia storage level 227, the final dosing rate 280. In addition, a global NOx efficiency 312 and ammonia slip 310 are shown, and are indicators of the capability of the reductant injection control routine 200. In operation, the first reductant dosing rate 240 is implemented as the final dosing rate 280 until there is an imbalance between first SCR ammonia storage level 216 and the second SCR ammonia storage level 218 that results in excess reductant on the second SCR 55 coupled with reduced reductant on the first SCR 54, with some allowance for hysteresis in the system, as occurs at timepoint 320. At this point, the second reductant dosing rate 260 is selected and implemented as the final dosing rate 280 that is output from the reductant injection control routine 200 and communicated to the controller 26 to control operation of the single reductant delivery system 60 to deliver reductant into the exhaust gas feedstream 51. This operation continues until the second SCR ammonia storage level 218 reduces to a predetermined amount, as indicated at timepoint 322. At this point, the first reductant dosing rate 240 is implemented as the final dosing rate 280. Such operation maintains the global NOx efficiency 312 at a substantially unchanged level while controlling the ammonia slip 310 to an acceptable level.

The concepts described herein advantageously result in minimizing or avoiding occurrence of ammonia slip out of the second SCR 55, including under conditions of high-gradient SCR temperature changes. Furthermore, consumption rates of the injected reductant can be controlled.

The flowchart and block diagrams in the flow diagrams illustrate the architecture, functionality, and operation of possible implementations of systems, methods, and computer programs according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:
1. An exhaust aftertreatment system configured to purify an exhaust gas feedstream for an internal combustion engine, comprising:
   first and second selective catalytic reduction devices (SCRs), wherein the first SCR is disposed upstream relative to the second SCR;
   a reductant injection system disposed to inject reductant into the exhaust gas feedstream upstream relative to the first SCR;
   a first temperature sensor disposed to monitor a first temperature of the exhaust gas feedstream upstream relative to the first SCR;
   a second temperature sensor disposed to monitor a second temperature of the exhaust gas feedstream upstream relative to the second SCR; and
   a controller operatively connected to the reductant injection system and in communication with the first and second temperature sensors and the internal combustion engine, wherein the controller includes an instruction set that is executable to:
  determine a total ammonia storage capacity for the first and second SCRs;
  determine an ammonia storage level on the first SCR and an ammonia storage level on the second SCR;
  determine a total SCR ammonia storage level for the first and second SCRs based upon the ammonia storage level on the first SCR and the ammonia storage level on the second SCR;
  determine a first storage error based upon the total ammonia storage capacity for the first and second SCRs and the total SCR ammonia storage level for the first and second SCRs;
  determine a second storage error based upon an ammonia storage level for the second SCR and an ammonia storage capacity for the second SCR;
  determine a first reductant dosing rate based upon the first storage error;
  determine a second reductant dosing rate based upon the second storage error; and
  control the reductant injection system to inject reductant into the exhaust gas feedstream based upon the second reductant dosing rate when the second storage error indicates an imbalance between the ammonia storage on the first SCR and the ammonia storage on the second SCR.

2. The exhaust aftertreatment system of claim 1, wherein the instruction set is executable to:
  control the reductant injection system to inject reductant into the exhaust gas feedstream based upon the second reductant dosing rate when the second storage error indicates an imbalance between the ammonia storage on the first SCR in relation to the ammonia storage capacity for the first SCR, and the ammonia storage on the second SCR in relation to the ammonia storage capacity for the second SCR.

3. The exhaust aftertreatment system of claim 1, wherein the instruction set is executable to control the reductant injection system to inject reductant into the exhaust gas feedstream based upon the second reductant dosing rate when the second storage error indicates the imbalance between the ammonia storage level on the first SCR and the ammonia storage level on the second SCR that is associated with ammonia slip.

4. The exhaust aftertreatment system of claim 1, wherein the instruction set is executable to:
  monitor first and second temperatures of the exhaust gas feedstream;
  monitor an exhaust gas flowrate;
  determine the ammonia storage level associated with the first SCR based upon the first temperatures of the exhaust gas feedstream and the exhaust gas flowrate; and
  determine the ammonia storage level associated with the second SCR based upon the second temperatures of the exhaust gas feedstream and the exhaust gas flowrate.

5. The exhaust aftertreatment system of claim 1, wherein the instruction set is executable to:
  monitor first and second temperatures of the exhaust gas feedstream;
  monitor an exhaust gas flowrate;
  determine the ammonia storage capacity associated with the first SCR based upon the first temperatures of the exhaust gas feedstream and the exhaust gas flowrate;
  determine the ammonia storage capacity associated with the second SCR based upon the second temperatures of the exhaust gas feedstream and the exhaust gas flowrate; and
  determine the total SCR ammonia storage capacity for the first and second SCRs based thereon.

6. The exhaust aftertreatment system of claim 1, wherein the reductant comprises urea.

7. The exhaust aftertreatment system of claim 1, wherein the instruction set is executable to control the reductant injection system to inject reductant into the exhaust gas feedstream based upon the first reductant dosing rate when the second storage error fails to indicate the imbalance between the storage on the first device and the storage on the second device.

8. The exhaust aftertreatment system of claim 1, wherein the reductant injection system is disposed to supply reductant to both the first SCR and to the second SCR.

9. A method for controlling reductant injection into an exhaust aftertreatment system disposed to purify an exhaust gas feedstream from an internal combustion engine, wherein the exhaust aftertreatment system includes a first selective catalytic reduction device (SCR) disposed upstream relative to a second SCR and a reductant injection system disposed to inject reductant into the exhaust gas feedstream upstream relative to the first SCR, the method comprising:
  determining a total ammonia storage capacity for the first and second SCRs;
  determining an ammonia storage level on the first SCR and an ammonia storage level on the second SCR;
  determining a total SCR ammonia storage level for the first and second SCRs based upon the ammonia storage level on the first SCR and the ammonia storage level on the second SCR;
  determining a first storage error based upon the total ammonia storage capacity for the first and second SCRs and the total SCR ammonia storage level for the first and second SCRs;
  determining a second storage error based upon an ammonia storage level for the second SCR and an ammonia storage capacity for the second SCR;
  determining a first reductant dosing rate based upon the first storage error;
  determining a second reductant dosing rate based upon the second storage error; and
  controlling, via a controller, the reductant injection system to inject reductant into the exhaust gas feedstream based upon the second reductant dosing rate when the second storage error indicates an imbalance between the ammonia storage on the first SCR and the ammonia storage on the second SCR.

10. The method of claim 9, comprising:
monitoring, via the controller, operation of the internal combustion engine to determine an exhaust gas flowrate,
monitoring first and second temperatures of the exhaust gas feedstream;
determining the total ammonia storage capacity for the first and second SCRs and the total SCR ammonia storage level for the first and second SCRs based upon the exhaust gas flowrate and the first and second temperatures of the exhaust gas feedstream.

11. The method of claim 9, further comprising:
controlling the reductant injection system to inject reductant into the exhaust gas feedstream based upon the second reductant dosing rate when the second storage error indicates an imbalance between the ammonia storage level on the first SCR and the ammonia storage level on the second SCR that is associated with ammonia slip.

12. The method of claim 9, comprising:
determining the ammonia storage level associated with the first SCR;
determining the ammonia storage level associated with the second SCR; and
determining the total SCR ammonia storage level for the first and second SCRs based thereon.

13. The method of claim 9, comprising:
determining the ammonia storage capacity associated with the first SCR;
determining the ammonia storage capacity associated with the second SCR; and
determining the total SCR ammonia storage capacity for the first and second SCRs based thereon.

14. The method of claim 9, wherein the reductant comprises urea.

15. The method of claim 9, further comprising controlling the reductant injection system to inject reductant into the exhaust gas feedstream based upon the first reductant dosing rate when the second storage error fails to indicate the imbalance between the storage on the first device and the storage on the second device.

16. A method for controlling reductant injection into an exhaust aftertreatment system disposed to purify an exhaust gas feedstream from an internal combustion engine, wherein the exhaust aftertreatment system includes a first selective catalytic reduction device (SCR) disposed upstream relative to a second SCR and a reductant injection system disposed to inject reductant into the exhaust gas feedstream upstream relative to the first SCR, the method comprising:
determining an ammonia storage capacity for the first SCR, an ammonia storage capacity for the second SCR, and a total ammonia storage capacity for the first and second SCRs based thereon;
determining an ammonia storage level on the first SCR and an ammonia storage level on the second SCR;
determining a total SCR ammonia storage level for the first and second SCRs based upon the ammonia storage level on the first SCR and the ammonia storage level on the second SCR;
determining a storage error based upon an ammonia storage level for the second SCR and an ammonia storage capacity for the second SCR;
determining a reductant dosing rate based upon the storage error; and
controlling, via a controller, the reductant injection system to inject reductant into the exhaust gas feedstream based upon the reductant dosing rate when the second storage error indicates an imbalance between the ammonia storage on the first SCR and the ammonia storage on the second SCR.

17. The method of claim 16, further comprising controlling the reductant injection system to inject reductant into the exhaust gas feedstream based upon the reductant dosing rate when the second storage error indicates an imbalance between the ammonia storage on the first SCR in relation to the ammonia storage capacity for the first SCR, and the ammonia storage on the second SCR in relation to the ammonia storage capacity for the second SCR.

18. The method of claim 17, comprising:
monitoring, via the controller, operation of the internal combustion engine to determine an exhaust gas flowrate,
monitoring first and second temperatures of the exhaust gas feedstream;
determining the total ammonia storage capacity for the first and second SCRs and the total SCR ammonia storage level for the first and second SCRs based upon the exhaust gas flowrate and the first and second temperatures of the exhaust gas feedstream.

19. The method of claim 17, further comprising:
determining the ammonia storage level associated with the first SCR; and
controlling the reductant injection system to inject reductant into the exhaust gas feedstream based upon the reductant dosing rate when the second storage error indicates an imbalance between the ammonia storage level on the first SCR and the ammonia storage level on the second SCR that is associated with ammonia slip.

20. The method of claim 17, comprising:
determining the ammonia storage capacity associated with the first SCR;
determining the ammonia storage capacity associated with the second SCR; and
determining the total SCR ammonia storage capacity for the first and second SCRs based thereon.

* * * * *